United States Patent
Reijersen Van Buuren

(10) Patent No.: US 9,408,349 B2
(45) Date of Patent: Aug. 9, 2016

(54) WRAPPER FOR WRAPPING ROUND BALES OF CROP MATERIAL

(75) Inventor: Willem Jacobus Reijersen Van Buuren, Dirksland (NL)

(73) Assignee: FORAGE INNOVATIONS B.V., Maassluis (NL)

( * ) Notice: Subject to any disclaimer, the term of this patent is extended or adjusted under 35 U.S.C. 154(b) by 885 days.

(21) Appl. No.: 13/592,395

(22) Filed: Aug. 23, 2012

(65) Prior Publication Data

US 2012/0324830 A1 Dec. 27, 2012

Related U.S. Application Data

(63) Continuation of application No. PCT/NL2010/000174, filed on Dec. 15, 2010.

(30) Foreign Application Priority Data

Feb. 23, 2010 (NL) .................................... 1037740

(51) Int. Cl.
*B65B 11/00* (2006.01)
*B65B 11/04* (2006.01)
*A01F 15/07* (2006.01)
*A01F 15/08* (2006.01)

(52) U.S. Cl.
CPC .............. *A01F 15/071* (2013.01); *A01F 15/085* (2013.01); *A01F 15/0875* (2013.01); *A01F 2015/074* (2013.01); *A01F 2015/0735* (2013.01); *A01F 2015/0755* (2013.01)

(58) Field of Classification Search
CPC ............ A01F 15/071; A01F 2015/074; A01F 2015/073; A01F 15/0875; A01F 2015/0735; A01F 15/085; A01F 2015/0755
USPC ..................................... 53/203, 204, 218, 211
See application file for complete search history.

(56) References Cited

U.S. PATENT DOCUMENTS

| | | | | |
|---|---|---|---|---|
| 4,685,270 | A * | 8/1987 | Brambilla ........................ | 53/176 |
| 5,486,785 | A * | 1/1996 | Blankenship .................. | 327/306 |
| 6,457,295 | B1 * | 10/2002 | Arnold ............................. | 53/211 |
| 7,000,533 | B2 * | 2/2006 | Derscheid et al. .............. | 100/87 |
| 7,197,979 | B2 * | 4/2007 | Derscheid ....................... | 100/87 |

(Continued)

FOREIGN PATENT DOCUMENTS

| | | |
|---|---|---|
| DE | 20 2006 015516 U1 | 1/2007 |
| EP | 1502497 A1 | 2/2005 |
| GB | 2245878 A | 1/1992 |
| WO | WO 9406272 A1 | 3/1994 |

*Primary Examiner* — Stephen F Gerrity
*Assistant Examiner* — Eyamindae Jallow
(74) *Attorney, Agent, or Firm* — Hoyng Rokh Monegier LLP; Ramin Amirsehhi; David P. Owen

(57) ABSTRACT

A wrapper for wrapping round bales of crop material includes a frame, a wrapping table pivotable between a wrapping position and a bale release position, a wrapping device, and an unloading device. The unloading device has an unloading arm movable between a receiving position and a release position, and a ground support movable between a lifted position and a support position, wherein the wrapper comprises a first actuator to move the unloading arm from the receiving position to the release position. The wrapper includes a second actuator arranged to move the ground support from the lifted position to the support position and to move the wrapping table at least partially from the wrapping position to the bale release position.

15 Claims, 3 Drawing Sheets

(56) References Cited

U.S. PATENT DOCUMENTS

| | | | |
|---|---|---|---|
| 8,069,638 B2* | 12/2011 | Wigdahl et al. | 53/587 |
| 8,113,113 B2* | 2/2012 | Pieper et al. | 100/88 |
| 8,261,512 B2* | 9/2012 | Gette et al. | 53/118 |
| 2004/0083905 A1* | 5/2004 | Viaud | 100/8 |
| 2004/0089167 A1* | 5/2004 | Viaud | 100/88 |
| 2004/0134177 A1* | 7/2004 | Viaud | 56/341 |
| 2004/0245028 A1* | 12/2004 | Viaud et al. | 177/145 |
| 2013/0145724 A1* | 6/2013 | Roberge et al. | 53/203 |

* cited by examiner

US 9,408,349 B2

WRAPPER FOR WRAPPING ROUND BALES OF CROP MATERIAL

CROSS REFERENCE TO RELATED APPLICATIONS

This application is a continuation of PCT application number PCT/NL2010/000174 filed on 15 Dec. 2010, which claims priority from Netherlands application number 1037740 filed on 23 Feb. 2010. Both applications are hereby incorporated by reference in their entireties.

BACKGROUND OF THE INVENTION

1. Field of the Invention

The invention relates generally to a wrapper for wrapping bales according to the preamble of claim a frame, a wrapping table pivotable between a wrapping position and a bale release position, a wrapping device and an unloading device for unloading of the bale after wrapping. In particular, the invention relates to a wrapper for wrapping round bales of crop material.

2. Description of the Related Art

Wrappers of this type are known in the art. In a known embodiment of the wrapper, the wrapper comprises a wrapping table to support the bale during wrapping, and a wrapping device to wrap wrapping material about the bale.

The wrapping table is usually configured to rotate the bale to make a complete wrapping of the bale possible. The wrapping table may for instance comprise rollers of which at least one is connected to a driving device; one or more conveyor belts may be provided on the rollers. In an embodiment, the wrapping table is pivotable between a wrapping position to support the bale during wrapping and a bale release position to release the bale from the wrapping table.

To avoid damage to the wrapped bale during release of the bale on a ground surface, an unloading device for unloading of the bale after wrapping may be provided. Such unloading device comprises an unloading arm pivotably mounted on the frame. The unloading arm is movable between a receiving position to receive a bale from the wrapping table, and a release position to smoothly release the bale on the ground surface. The unloading device may comprise a ground support pivotably mounted on the frame of the wrapper and movable between a lifted position and a support position. In the support position the ground support rests on a ground surface to provide back end support to the wrapper during unloading of a bale to avoid backwards tilting of the wrapper due to the large mass of the bale at the back end of the wrapper.

Examples of such wrappers are disclosed in EP 674 477, which is hereby incorporated by reference in its entirety, showing a wrapper with an unloading device including a ground support and GB 2245878, which is hereby incorporated by reference in its entirety, showing a wrapper with an unloading device without a ground support.

BRIEF SUMMARY OF THE INVENTION

The aim of the invention is to provide a wrapper for wrapping bales of crop material comprising an unloading device including a ground support, having an efficient construction for carrying out the movements of the wrapping table, unloading arm and ground support, or at least to provide an alternative wrapper.

The present invention provides a wrapper for wrapping bales, in particular round bales of crop material, comprising:

a frame,
a wrapping table mounted on the frame to support a bale during wrapping, the wrapping table being pivotable between a wrapping position and a bale release position,
a wrapping device mounted on the frame to wrap wrapping material about the bale, and
an unloading device for unloading of the bale after wrapping, wherein said unloading device comprises an unloading arm pivotably mounted on the frame and a ground support pivotably mounted on the frame, wherein the unloading arm is movable between a receiving position to receive a bale from the wrapping table, and a release position to release the bale on the ground surface, and wherein the ground support is movable between a lifted position and a support position, wherein the ground support rests on a ground surface, wherein the wrapper comprises a first actuator to move the unloading arm from the receiving position to the release position, characterized in that the wrapper comprises a second actuator arranged to move the ground support from the lifted position to the support position and to move the wrapping table at least partially from the wrapping position to the bale release position.

According to the invention, at least two actuators are provided for the movements of the wrapping table, unloading arm and the ground support, whereby one actuator is provided to move the unloading arm, and another actuator is provided to move the ground support from the lifted position to the support position and to move at least partially the wrapping table from the wrapping position to the bale release position.

Usually the unloading arm and the ground support are arranged at the back end of the wrapper.

In the support position the ground support rests on a ground surface to provide back end support to the wrapper during unloading of a bale to avoid backwards tilting of the wrapper due to the large mass of the bale at the back end of the wrapper. In the lifted position the ground support is lifted with respect to the ground surface.

It is remarked that the term partially means that the second actuator can only move the wrapping table over a limited angle of the complete angle from the wrapping position to the bale release position, and/or that the second actuator carries out this movement in combination with a further actuator. The unloading device may be mounted on the frame.

In an embodiment, the wrapper comprises a third actuator arranged to move in combination with the second actuator the wrapping table between the wrapping position and the bale release position.

In this embodiment a third actuator is provided to move the wrapping table from the wrapping position to the bale release position, for instance when the second actuator is only capable of moving the wrapping table over a limited angle, or when extra force is required for movement of the wrapping table.

In an embodiment, the ground support is pivotable about a pivot axis and comprises a first arm extending from the pivot axis, the distal end of the first arm configured to rest on a ground surface in the support position, and a second arm extending from the pivot axis at an angle of at least 120 degrees with respect to the first arm, the distal end of the second arm comprising an abutting surface to abut against the wrapping table.

In this embodiment the ground support can be pivoted between the lifted position and the support position. During the movement of the first arm from the lifted position to the support position, the abutting surface of the second arm pushes the wrapping table from the wrapping position towards the bale release position. The second actuator can be arranged between the frame and the ground support to move the ground support and to move via the abutting surface the wrapping table.

Generally, the angle between the usually horizontal wrapping position and the bale release position of the wrapping table does not have to be the same as the angle between the support position and a horizontal position of the ground support.

By adapting the angle between the arms of the ground support, the angle between the lifted position and the support position can be made corresponding to the angle between the wrapping position and the bale release position. When the angle is substantially the same, the ground support and the wrapping table can simultaneously move from the lifted position to the support position and from the wrapping position to the bale release position, respectively.

In an embodiment, the angle between the first arm and the second arm is substantially 180 degrees. In such embodiment the first arm and second arm extending from the pivot axis can be advantageously formed by a single elongate beam or other elongate element.

In an embodiment, a pressure element, for instance a compression spring or a hydraulic cylinder, is arranged between the ground support and the wrapping table. When the ground support contacts the ground surface, i.e. is in the support position, before the wrapping table reaches the bale release position, the pressure element may, in combination with or as an alternative for the third actuator, be provided between the ground support and the wrapping table to move the wrapping table further to the bale release position. Such pressure element is in particular suitable when the second actuator is arranged between the frame and the ground support.

In an alternative embodiment, an extension element, for instance an extension spring or a hydraulic cylinder, is arranged between the ground support and the wrapping table. Such extension element is in particular suitable for an embodiment wherein the second actuator is arranged between the frame and the wrapping table.

When the wrapping table is moved from the wrapping position towards the bale release position, the extension element pulls the ground support along with the wrapping table. When the ground support contacts the ground surface before the wrapping table reaches the bale release position, the second actuator can tilt the wrapping table further towards the bale release position, while extending the extension element between the ground support and the wrapping table.

In an embodiment, the first actuator and second actuator are coupled to a hydraulic circuit having a common hydraulic actuation valve, wherein the first and second actuator can be controlled by said common hydraulic actuation valve. In such embodiment, the whole unloading process can be started by a single actuation action of the common actuation valve.

In an embodiment, the third actuator is also coupled to the hydraulic circuit and controlled by said common hydraulic actuation valve.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
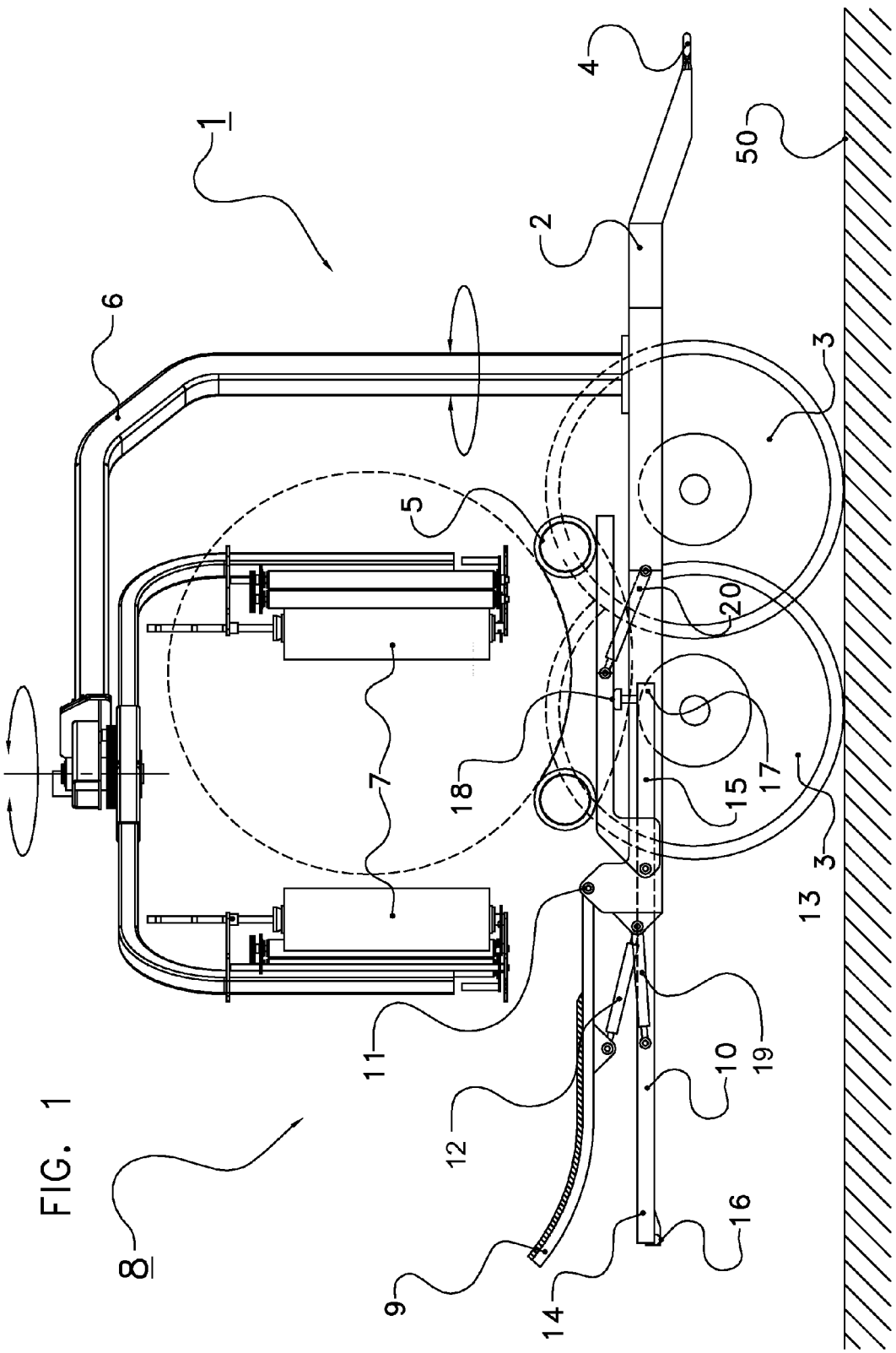
FIG. 1 shows a side view of a wrapper according to the invention with the wrapping table in the wrapping position.

The following is a description of certain embodiments of the invention, given by way of example only and with reference to the drawings. FIG. 1 shows a wrapper according to the invention, generally indicated by the reference numeral 1. The wrapper 1 is configured to wrap bales in wrapping material, such as plastic film material.

The wrapper 1 comprises a frame 2 which is supported on a ground surface 50 by wheels 3. The front end 4 of the wrapper 1 can be connected to a pulling vehicle (not shown) to pull the wrapper over the ground surface 50. The wrapper 1 may further be connected to a hydraulic power source of the pulling device.

A wrapping table 5 and a wrapping device 6 are mounted on the frame 2. A loading device (not shown) may be provided to load a bale from the ground surface 50 on the wrapping table 5 to enable wrapping of the bale. The loading device will usually be mounted at the front side of the wrapper 1. A loading device such as the one described in PCT/NL2010/000172, which is hereby incorporated by reference in its entirety, may be implemented.

Figure 3:
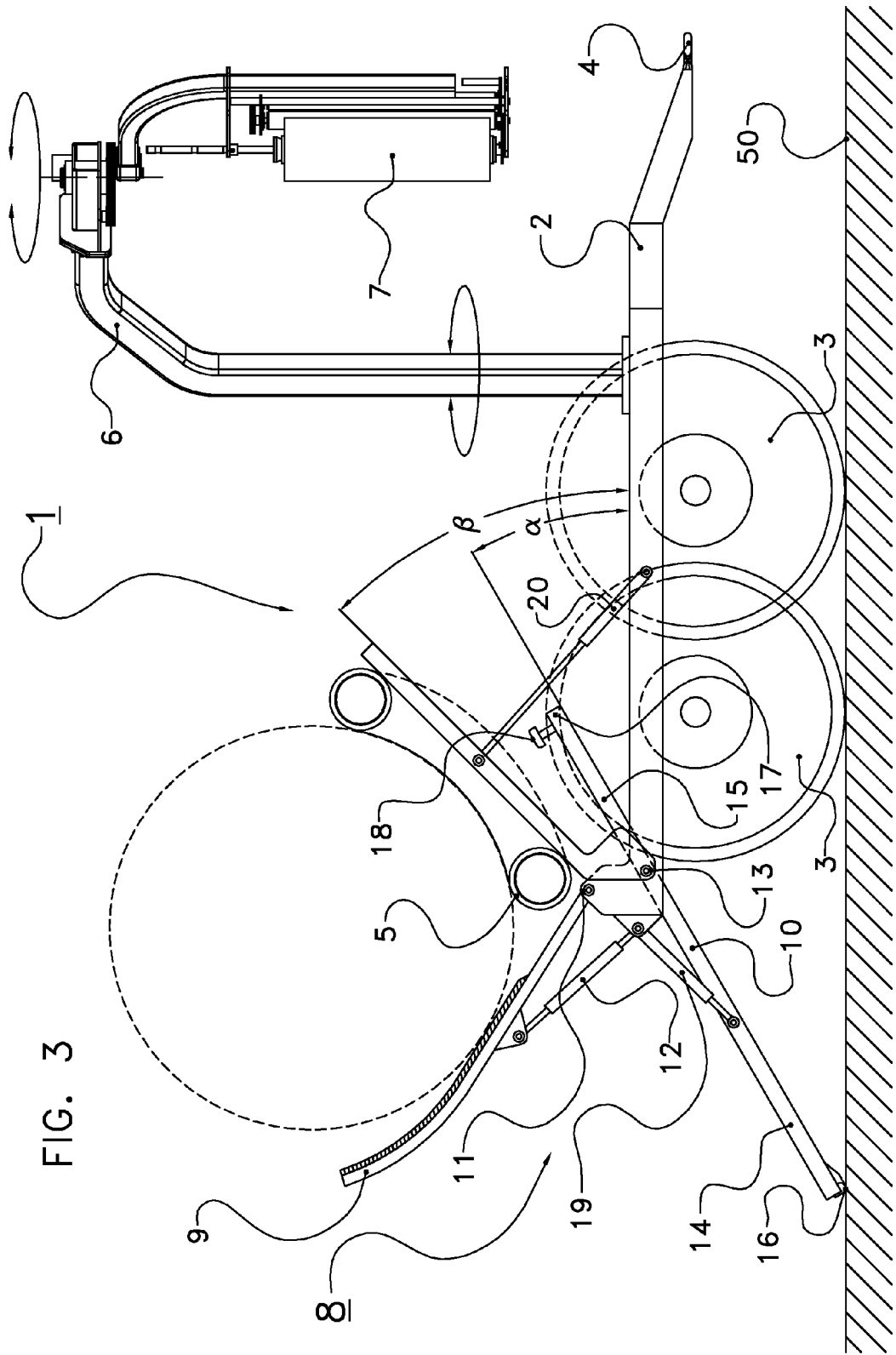
FIG. 3 shows a side view of the wrapper of FIG. 1 with the wrapping table completely lifted to the bale release position.

The wrapping table 5 is configured to support a bale during wrapping. The wrapping table 5 is pivotable between a wrapping position and a bale release position. In the wrapping position the support surface of the wrapping table is substantially horizontal to provide a proper support to a bale during wrapping (FIG. 1). After wrapping the wrapping table 5 may be pivoted to the bale release position at an angle β of for example 45 degrees, as shown in FIG. 3, to release the bale from the wrapping table 5 at the backside of the wrapper 1.

Some wrapping tables 5 may also be tilted forwardly to a bale receiving position, in which the wrapping table 5 is in a favourable position for loading a bale on the wrapping table, for instance by the loading arm, or another suitable device or construction.

The wrapping device 6 is configured to wrap a bale supported on the wrapping table 5 in film material which is provided on rolls 7. By rotation of the bale on the wrapping table 5 about its own axis, and simultaneous rotation of the rolls of wrapping material 7 about the bale, the bale can be completely wrapped in wrapping material. Further, lateral guide elements may be implemented in the wrapping device, as described in PCT/NL2010/000173, which is hereby incorporated by reference in its entirety.

Wrapping tables 5 and wrapping devices 6 are well-known in the art, and any suitable combination may be applied in the wrapper according to the invention.

At the back-end of the wrapper 1 an unloading device 8 configured to unload a bale from the wrapping table 5 after wrapping is provided. Such unloading device 8 may be provided to smoothly transfer the bale from the wrapping table 5 to the ground surface 50. In this way, damage to the wrapped bale due to falling directly from the wrapping table 5 on the ground surface 50 may be avoided.

The unloading device 8 comprises an unloading arm 9 and a ground support 10. The unloading arm 9 is pivotably mounted on the frame 2 and can be pivoted about pivot axis 11 between a receiving position to receive a bale from the wrapping table 5, and a release position to release the bale on the ground surface 50. A first hydraulic cylinder 12 is provided between the frame 2 and the unloading arm 9 to move the unloading arm 9 between the receiving position and the release position.

The ground support 10 is provided as support during unloading of a bale. When a bale is unloaded from the wrapper 1 a substantial force may be exerted on the back end of the wrapper 1. To avoid that the wrapper tilts backwards as a result of this force, the ground support 10 is provided to counter the tilting moment resulting from this force.

The ground support 10 is pivotably mounted on the frame 2. The ground support 10 can be pivoted about pivot axis 13. A first arm 14 and a second arm 15 of the ground support 10 extend from the pivot axis 13 in opposite directions. The first arm 14 and the second arm 15 extend at an angle of 180 degrees from the pivot axis 13, and are formed by a single beam. In alternative embodiments, the angle between the first arm 14 and the second arm 15 may be different. By using a different, non-180 degrees angle between the first arm 14 and the second arm 15, the pivot angle of the ground support 10 can be adjusted to the pivot angle of the wrapping table.

Figure 2:
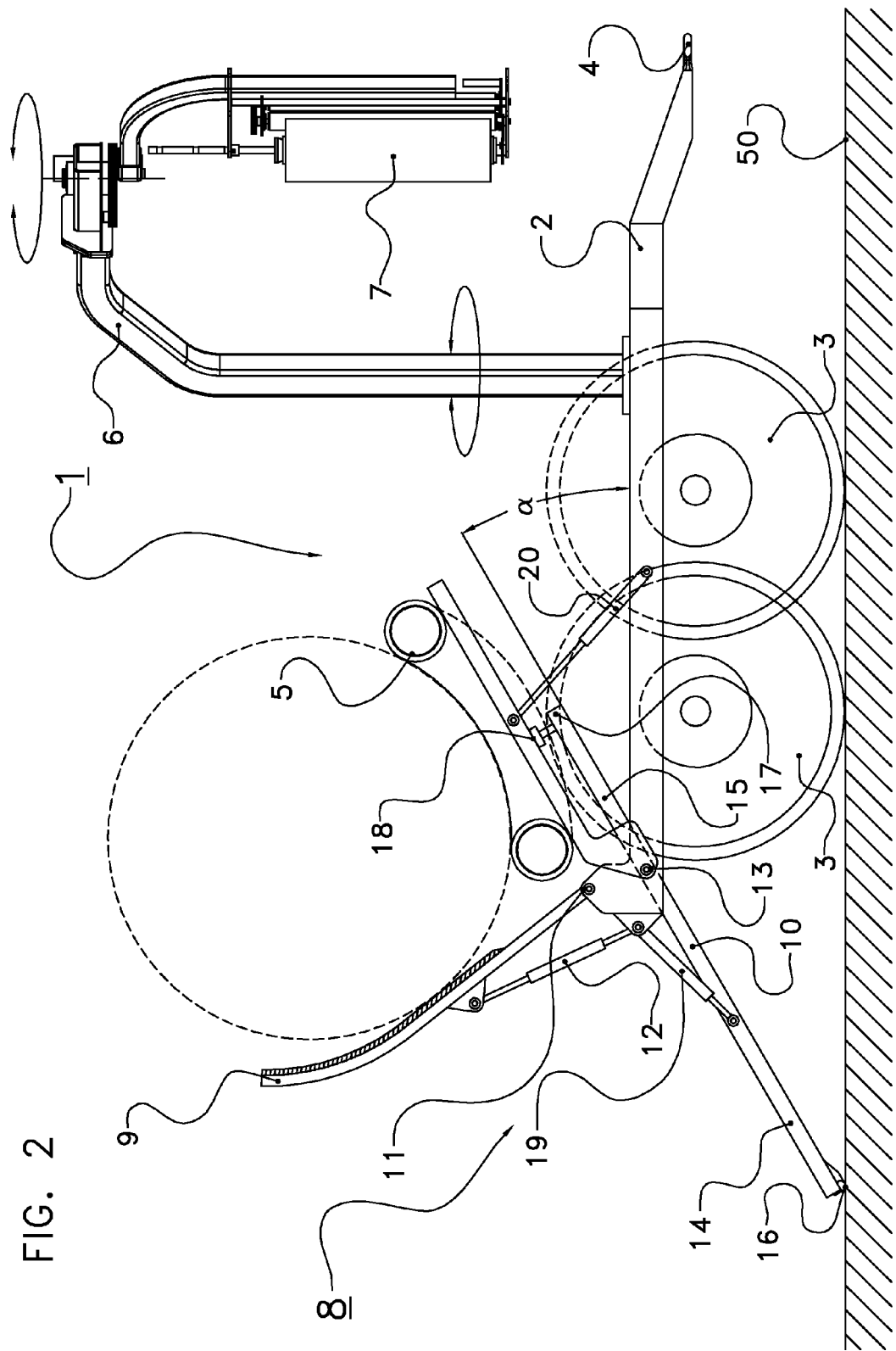
FIG. 2 shows a side view of the wrapper of FIG. 1 with the wrapping table partially lifted to the bale release position.

The ground support 10 can be pivoted between a lifted position (FIG. 1) and a support position (FIGS. 2 and 3). In the lifted position the ground support 10 extends substantially horizontally, and provides no support for the wrapper 1. The ground support 10 will be typically arranged in this position during all stages of the wrapping process except during unloading of a bale.

When a bale is unloaded, the ground support 10 is moved to the support position, wherein a distal end 16 of the first arm 14 rests on the ground surface 50 to support the back end of the wrapper 1.

A distal end 17 of the second arm 15 comprises an abutting surface 18 arranged to abut against the wrapping table 5.

A second hydraulic cylinder 19 is provided to move the ground support 10 between the lifted position and the support position, and via the second arm 15 and the abutting surface 18 to move partially the wrapping table 5 from the wrapping position to the bale release position. The second hydraulic cylinder 19 is arranged between the frame 2 and the first arm 14 of the ground support 10.

In the shown embodiment it is of importance that the ground support is moved to the support position before the wrapping table 5 reaches the bale release position to avoid backward tilting of the wrapper 1.

As a result, the ground support 10 can tilt the wrapping table 5 only over a limited angle of the complete angle between the wrapping position and the bale release position. For instance, the ground support 10 will pivot over an angle α of for example 30 degrees to move from the lifted position to the support position, while the angle β between the wrapping position and the bale release position of the wrapping table 5 is for example 45 degrees (FIG. 3).

To move the wrapping table 5 from the intermediate position at angle α (FIG. 2) to the bale release position at angle β (FIG. 3) a third hydraulic cylinder 20 is provided. This third cylinder 20 is arranged between the frame 2 and the wrapping table 5, and may also be used in combination with the second hydraulic cylinder 19 to move the wrapping table 5 from the wrapping position to the intermediate position. This has the advantage that the second hydraulic cylinder 19 and the third hydraulic cylinder 20 are used in combination to start movement of the wrapping table from the wrapping position. At this moment, the largest force is required for movement of the wrapping table 5 and the bale supported on it. Since two hydraulic cylinders are used, the hydraulic cylinders can be of more simple design and less powerful resulting in less cost per cylinder, when compared to the use of only one hydraulic cylinder for this task.

The first hydraulic cylinder 12, second hydraulic cylinder 19 and the third hydraulic cylinder 20 are connected to the same hydraulic circuit. The hydraulic circuit is connected to a pressure source and comprises a common actuation valve.

The unloading process of a bale will now be described.

When the wrapping of a bale is finished, the common actuation valve can be actuated for activation of the unloading process. By actuating the common actuation valve the first hydraulic cylinder 12, the second hydraulic cylinder 19 and the third hydraulic cylinder 20 will be connected to the pressure source.

Firstly the first actuator 12 will move the unloading arm 9 from the release position to the receiving position. When the unloading arm 9 is positioned in the receiving position, the second hydraulic cylinder 19 and the third hydraulic cylinder 20 will move the ground support 10 from the lifted position to the support position and move the wrapping table 5 from the wrapping position to the bale release position. The second hydraulic cylinder 19 will exert a force on both the ground support 10 and the wrapping table 5 until the intermediate position of the wrapping table 5 is reached.

When the ground support 10 and the wrapping table 5 are pivoted over the angle α, the distal end 16 of the first arm 14 comes into contact with the ground surface 50 so that the ground support 10 is in the support position. As a result, the ground support 10 will provide back end support against tilting of the wrapper, when the wrapping table 5 is moved further to the bale release position.

FIG. 2 shows this situation wherein the unloading arm 9 is in the receiving position, the ground support 10 in the support position, and the wrapping table is in an intermediate position between the wrapping position and the bale release position.

From this situation the third hydraulic cylinder 20 pushes the wrapping table 5 further towards the bale release position shown in FIG. 3. In this position the bale will roll from the wrapping table 5 on the unloading arm 9. Due to the mass of the bale, the unloading arm will move to the release position where the bale is released on the ground surface. When the unloading arm 9 has reached the release position, the wrapping table 5 will tilt back to the wrapping position, and when the wrapping table 5 has reached the intermediate position shown in FIG. 2, the wrapping table 5 will also push the ground support 10 back to the lifted position.

In the embodiment shown in the drawings the second hydraulic cylinder 19 is used to move the ground support 10 from the lifted position to the support position and to move the wrapping table partially from the wrapping position to the bale release position. A third hydraulic cylinder 20 is provided to move the wrapping table 5 from the intermediate position shown in FIG. 2 to the bale release position shown in FIG. 3.

In an alternative embodiment the third hydraulic cylinder 20 may be omitted and a pressure element, for instance a compression spring or a hydraulic cylinder, may be provided between the ground support 10 and the wrapping table 5, for instance at the location of the abutting surface 18 and an associated abutting surface of the wrapping table 5. In such embodiment, the pressure element may press the wrapping table 5 from the intermediate position to the bale release position.

In another alternative embodiment, the second hydraulic cylinder 19 of the embodiment shown in FIGS. 1-3 may be omitted and an extension element, for instance an extension spring or a hydraulic cylinder, may be provided between the wrapping table 5 and the ground support 10 for instance at the location of the abutting surface 18 and an associated abutting surface of the wrapping table 5. In such embodiment the hydraulic cylinder 20 may press the wrapping table 5 towards the bale release position.

The extension element will pull the ground support 10 along with the movement of the wrapping table until the distal end 16 of the first arm 14 contacts the ground surface 50 and the ground support 10 is in the support position. From this situation which corresponds with the situation in FIG. 2, the third hydraulic cylinder 20 will move the wrapping table 5 further to the bale release position, while extending the extension element, so that the ground support can remain in the support position. It will be clear that in this embodiment, the third hydraulic cylinder is the second cylinder of the invention that is arranged to move the ground support from the lifted position to the support position and to move the wrapping table from the wrapping position to the bale release position.

It is remarked that the wrapper shown in drawings 1 and 2 is a stand-alone wrapper configured to pick-up bales from a ground surface. The wrapper according to the invention may also be arranged in a baler-wrapper combination, wherein the bale after baling is directly transferred to the wrapper.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A wrapper for wrapping round bales of crop material, comprising:
   a frame,
   a wrapping table mounted on the frame to support the bale during wrapping, the wrapping table being pivotable between a wrapping position and a bale release position,
   a wrapping device mounted on the frame to wrap wrapping material about the bale, and
   an unloading device for unloading of the bale after wrapping, wherein said unloading device comprises an unloading arm pivotably mounted on the frame and a ground support pivotably mounted on the frame,
   wherein the unloading arm is movable between a receiving position to receive a bale from the wrapping table in the bale release position, and a release position to release the bale on the ground surface, and wherein the ground support is movable between a lifted position and a support position, wherein the ground support rests on a ground surface,
   wherein the wrapper comprises a first actuator to move the unloading arm from the receiving position to the release position,
   and wherein the wrapper comprises a second actuator arranged to move the ground support from the lifted position to the support position and to move the wrapping table at least partially from the wrapping position to the bale release position.

2. The wrapper of claim 1, wherein the wrapper comprises a third actuator arranged to move in combination with the second actuator the wrapping table between the wrapping position and the bale release position.

3. The wrapper of claim 2, wherein at least one of the first actuator, second actuator and third actuator are linear actuators.

4. The wrapper of claim 3, wherein the linear actuator is a hydraulic cylinder.

5. The wrapper of claim 3, wherein the first and second actuator are coupled to a hydraulic circuit having a common hydraulic actuation valve, wherein the first and second actuator can be controlled by said common hydraulic actuation valve.

6. The wrapper of claim 5, wherein the third actuator is coupled to the hydraulic circuit and is also controlled by the common hydraulic actuation valve.

7. The wrapper of claim 1, wherein the second actuator is arranged between the frame and the ground support.

8. The wrapper of claim 1, wherein the ground support is pivotable about a pivot axis and comprises a first arm extending from the pivot axis, the distal end of the first arm configured to rest on a ground surface in the support position, and a second arm extending from the pivot axis at an angle of at least 120 degrees with respect to the first arm, the distal end of the second arm comprising an abutting surface to abut against the wrapping table.

9. The wrapper of claim 8, wherein the angle is substantially 180 degrees.

10. The wrapper of claim 9, wherein a pressure element is arranged between the ground support and the wrapping table.

11. The wrapper of claim 10, wherein the pressure element is a compression spring or a hydraulic cylinder.

12. The wrapper of claim 1, wherein the second actuator is arranged between the frame and the wrapping table.

13. The wrapper of claim 12, wherein an extension element is arranged between the ground support and the wrapping table.

14. The wrapper of claim 13, wherein the extension element is an extension spring or a hydraulic cylinder.

15. The wrapper of claim 1, wherein the first actuator is arranged between the unloading arm and the frame.

* * * * *